Figures 1, 2, 3, 4, 5:
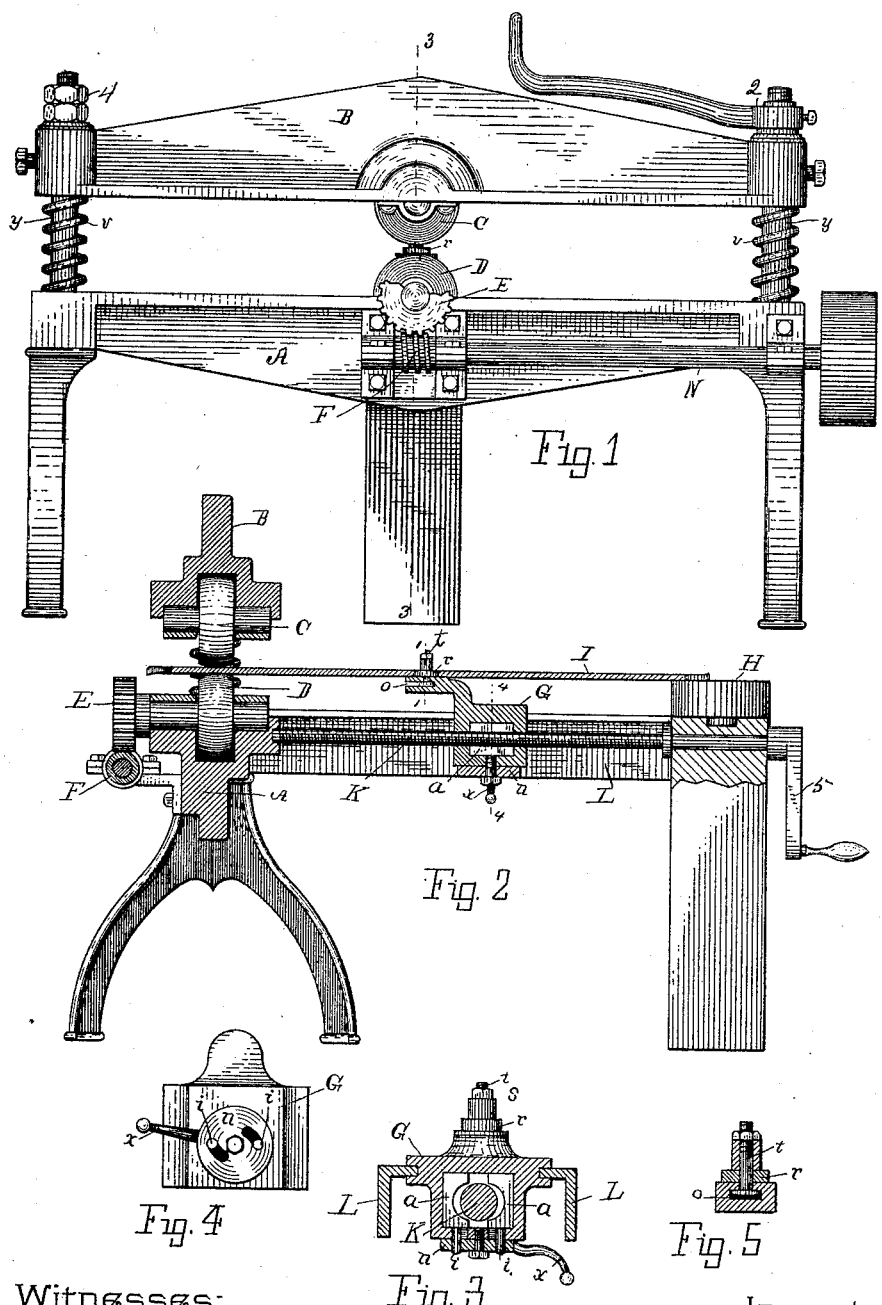

(No Model.)

N. W. MORTORFF.
CIRCULAR SAW SMITHING MACHINE.

No. 437,221. Patented Sept. 30, 1890.

Witnesses:
Walter S. Wood
Belle C. Truman

Inventor.
Noah W. Mortorff
By Lucius C. West
Att'y.

UNITED STATES PATENT OFFICE.

NOAH W. MORTORFF, OF JENNINGS, MICHIGAN.

CIRCULAR-SAW-SMITHING MACHINE.

SPECIFICATION forming part of Letters Patent No. 437,221, dated September 30, 1890.

Application filed February 26, 1890. Serial No. 341,854. (No model.)

*To all whom it may concern:*

Be it known that I, NOAH W. MORTORFF, a citizen of the United States, residing at Jennings, county of Missaukee, State of Michigan, have invented a new and useful Circular-Saw-Smithing Machine, of which the following is a specification.

This invention relates to that class of machines which are provided with two rollers—one above another—between which rollers the saw is passed, said arrangement of rollers being similar to that found in straight-saw-stretching machines.

The object of this invention consists in certain described and claimed features of construction in a machine for "smithing" circular saws.

In the drawings forming a part of this specification, Figure 1 is an end elevation looking from a point at the left of Fig. 2. Fig. 2 is a section on line 3 3 in Fig. 1, looking from a point at the right. Fig. 3 is a section on line 4 4 in Fig. 2, looking from a point at the right. Fig. 4 is an inverted plan of Fig. 3, and Fig. 5 is a section on line 1 1 in Fig. 2.

Referring to the lettered parts of the drawings, A L L is the frame of the machine, the parts L L thereof consisting of two parts parallel with each other and extending back at right angles from the part A, Figs. 2 and 3.

At C D are the rollers. The roller D is driven by means of the power shaft N and gears E F, as in Figs. 1 and 2; but any suitable mechanism may be employed. The roller C has bearings in the upper beam B in the ordinary manner. This arm is mounted loosely upon posts *y* at each end, and is supported by springs *v* on said posts, so that when the lever-nut 2 is loosened the beam B will rise up to release the saw I between them. The beam B is held down upon the springs *v* by said lever-nut 2, and the nut 4 is used for adjusting the beam B, so as to control the distance between the rollers C D. This saw is shown in section in Fig. 2, mounted upon a washer *r*, and above said washer is a sleeve S, which sleeve is detachably held onto the bolt *t* by a nut, so that said sleeve can be taken off and others of different sizes substituted in place of it, according to the diameter of the hole in the center of the saw. This constitutes an axis around which the saw turns, said axis being attached to the carriage G by the bolt *t*, the head of said bolt being passed into an open slot *o* in a manner to be readily detached, so that the axis can be changed from one size to another, according to the diameter of the hole at the center of the saw. This carriage G is moved forward and back by the screw-shaft K, upon which it is mounted, as in Fig. 2, said carriage having slide-bearings on the bars L L, as in Fig. 3.

The object of moving the carriage G is in order to bring any desired surface of the revolving saw between the rollers when stretching the same. The design is that when but a slight adjustment of the saw between the rollers is desired at a time it will be made by turning the crank 5 of the screw-shaft K.

When removing the saw I from between the rollers or carrying it over onto the anvil H for the purpose of hammering uneven places, it is desired to move the carriage G more quickly than can be effected by turning the crank 5. To this end I provide the carriage G with a two-part nut *a a*, having internal threads to engage with the threads of the screw-shaft K. A cam *n* is pivoted to the under side of the carriage G and has two eccentric-slots, through which slots a projection *i* from each part of the nut *a* is passed, as in Figs. 3 and 4. By turning the lever *x* of the cam *n* in one direction the nuts *a a* are made to close against the screw-shaft K when desiring to move the carriage by turning the crank 5, and by turning the lever *x* in the opposite direction the nuts *a a* are opened, and the carriage G can be quickly moved on its slide-bearings by pushing it one way or the other by hand.

Having thus described my invention, what I claim as new, and desire to secure by Letters Patent of the United States, is—

1. In a circular-saw-smithing machine, the combination of the frame, the rollers, the upper one having bearings in an arm above held down by suitable means against a spring resistance, and a movable axis over which the center hole of the saw is placed, substantially as set forth.

2. In a circular-saw-smithing machine, the combination of the frame, the rollers and means to operate them, the movable carriage having the axis to hold the saw, and the screw-shaft upon which the carriage is mounted, said carriage being provided with a two-part clamping-nut adapted to engage the screw-shaft, substantially as set forth.

3. In a circular-saw-smithing machine, a frame, the rollers, the movable carriage for supporting the saw, and an axis having a headed end detachable in an open slot of said carriage, substantially as set forth.

In testimony of the foregoing I have hereunto subscribed my name in presence of two witnesses.

NOAH W. MORTORFF.

Witnesses:
W. S. KNEELAND,
H. M. DUNHAM.